United States Patent [19]

Hazan et al.

[11] Patent Number: 5,066,698

[45] Date of Patent: Nov. 19, 1991

[54] COATING COMPOSITION OF AN ACRYLIC POLYMER, A CROSSLINKING AGENT AND A SILANE OLIGOMER

[75] Inventors: Isidor Hazan, Clementon, N.J.; John D. Nordstrom, Detroit, Mich.

[73] Assignee: E. I. Du Pont de Nemours and Company, Wilmington, Del.

[21] Appl. No.: 521,556

[22] Filed: May 10, 1990

[51] Int. Cl.$^5$ .............................................. C08K 5/54
[52] U.S. Cl. .................................... 524/269; 524/268
[58] Field of Search .............................. 524/268, 269

[56] References Cited

U.S. PATENT DOCUMENTS

| | | | |
|---|---|---|---|
| 3,650,811 | 3/1972 | Nordstrom et al. | 117/93.31 |
| 3,650,812 | 3/1972 | Nordstrom et al. | 117/93.31 |
| 3,706,709 | 12/1972 | Erikson et al. | 260/80.71 |
| 3,997,485 | 12/1976 | Dowbenko et al. | 260/22 S |
| 4,043,953 | 8/1977 | Chang et al. | 260/18 S |
| 4,093,673 | 6/1978 | Chang et al. | 260/824 EP |
| 4,098,840 | 7/1978 | Yoshida et al. | 260/827 |
| 4,121,000 | 10/1978 | Wald | 428/35 |
| 4,147,688 | 4/1979 | Makhlouf et al. | 260/33.6 EP |
| 4,213,886 | 7/1980 | Turner | 260/29.6 MM |
| 4,224,211 | 9/1980 | Kanazawa et al. | 260/31.2 R |
| 4,403,064 | 7/1983 | Kania | 427/407.1 |
| 4,467,081 | 8/1984 | Chang et al. | 528/26 |
| 4,493,914 | 1/1985 | Chattha | 523/436 |
| 4,499,150 | 2/1985 | Dowbenko et al. | 428/447 |
| 4,499,151 | 2/1985 | Dowbenko et al. | 428/450 |
| 4,528,317 | 7/1985 | Theodore et al. | 524/504 |
| 4,530,957 | 7/1985 | Theodore et al. | 524/504 |
| 4,533,681 | 8/1985 | Cassatta et al. | 523/400 |
| 4,533,695 | 8/1985 | Theodore et al. | 524/504 |
| 4,564,557 | 1/1986 | Ohgushi et al. | 428/333 |
| 4,604,443 | 8/1986 | Chang et al. | 528/28 |
| 4,605,720 | 8/1986 | Chattha et al. | 524/504 |
| 4,673,718 | 6/1987 | Ryntz et al. | 525/476 |
| 4,681,811 | 7/1987 | Simpson et al. | 428/413 |
| 4,684,697 | 8/1987 | Chang et al. | 525/100 |
| 4,746,714 | 5/1988 | Spinelli et al. | 525/286 |
| 4,754,014 | 6/1988 | Ryntz et al. | 528/28 |
| 4,764,569 | 8/1988 | Umemoto et al. | 525/446 |
| 4,766,185 | 8/1988 | Ryntz et al. | 525/479 |
| 4,795,783 | 1/1989 | Hunt | 525/58 |
| 4,804,732 | 2/1989 | Ryntz et al. | 528/28 |
| 4,873,298 | 10/1989 | Ryntz | 525/479 |

FOREIGN PATENT DOCUMENTS

| | | |
|---|---|---|
| 265929 | 5/1988 | European Pat. Off. . |
| 307954 | 3/1989 | European Pat. Off. . |
| 3533377 | 3/1987 | Fed. Rep. of Germany . |
| 49-033926 | 3/1974 | Japan . |
| 51-027886 | 3/1976 | Japan . |
| 55-000758 | 1/1980 | Japan . |
| 55-008028 | 3/1980 | Japan . |
| 58-098366 | 6/1983 | Japan . |
| 59-071316 | 4/1984 | Japan . |
| 60-018554 | 1/1985 | Japan . |
| 60-018706 | 5/1985 | Japan . |
| 60-120769 | 6/1985 | Japan . |
| 60-217230 | 10/1985 | Japan . |
| 60-056194 | 12/1985 | Japan . |
| 61-162560 | 7/1986 | Japan . |
| 61-162563 | 7/1986 | Japan . |
| 61-253364 | 11/1986 | Japan . |
| 61-281166 | 12/1986 | Japan . |
| 62-001764 | 1/1987 | Japan . |
| 62-263265 | 11/1987 | Japan . |
| 63-036882 | 2/1988 | Japan . |
| 63-039969 | 2/1988 | Japan . |
| 63-010677 | 6/1988 | Japan . |
| 63-146977 | 6/1988 | Japan . |
| 1-000438 | 1/1989 | Japan . |
| 64-001772 | 1/1989 | Japan . |
| 01-014281 | 1/1989 | Japan . |
| 1-025347 | 5/1989 | Japan . |
| 1-026384 | 5/1989 | Japan . |
| 01-150151 | 6/1989 | Japan . |
| 01-165673 | 6/1989 | Japan . |
| 8800079 | 1/1988 | Spain . |
| 2089826 | 6/1982 | United Kingdom . |
| 2192399 | 6/1988 | United Kingdom . |

OTHER PUBLICATIONS

J. Appl. Polym. Sci. 1985, vol. 30, No. 5, pp. 2115–2135, S.C.S., Polym. Preprints 1987, vol. 28, No. 1, pp. 458–460.

*Primary Examiner*—Joseph L. Schofer
*Assistant Examiner*—Jeffrey T. Smith
*Attorney, Agent, or Firm*—Hilmar L. Fricke

[57] ABSTRACT

A high solids coating composition useful as a clear coat for an automotive clear coat/color coat finish which contains about 40–80% by weight of a binder and correspondingly about 20–60% by of a liquid organic carrier; wherein the binder contains about:

a. an acrylic solution polymer of polymerized monomers of ethylenically unsaturated esters of acrylic acid or methacrylic acid and a hydroxy alkyl acrylate or methacrylate and the polymer has a hydroxyl no. of about 50–200 and a weight average molecular weight of about 4,000–20,000;

b. a dispersed polymer of polymerized monomers having stabilizer resin segment that is soluble in the organic carrier and dispersed resin segment that is relatively insoluble in the organic carrier;

c. a siloxane oligomer having —OH and —OR groups attached to the silane atoms of the oligomer where R is an alkyl group having 1–6 carbon atoms in the alkyl group or an aryl group and the oligomer has a weight average molecular weight of about 500–5,000; and d. an alkylated melamine formaldehyde resin.

12 Claims, No Drawings

COATING COMPOSITION OF AN ACRYLIC POLYMER, A CROSSLINKING AGENT AND A SILANE OLIGOMER

BACKGROUND OF THE INVENTION

This invention is directed to a coating composition and in particular to a durable clear coating composition that can be applied over a pigmented or base coat to provide a clear coat/color coat finish on a substrate.

Clear coat/color coat finishes have been used for automobiles and trucks in recent years to provide for a durable and glossy finish that has an excellent appearance. Coating compositions used for these clear coat/color coat finishes containing alkoxy silane polymers are known in the art and are shown in U.S. Pat. Nos. 4,499,150 and 4,499,151 both issued to Dowbenko et al on Feb. 12, 1985. But the compositions of these patents do not provide consistent properties upon curing as needed for an automotive clear finish and high quality and durability required for the clear finish of autos and trucks.

One of the recent problems encountered is the etching of the clear coat by acid rain and the ultimate degradation of the clear coat/color coat finish. There is a need for a clear coating composition that has a high solids content for compliance with pollution regulations, has desirable application characteristics, has excellent adhesion to all types of color coats such as solvent based, water based or powder coatings and that provides a finish that has an excellent appearance, adhesion, weatherability, durability and resistance to etching by acidic fallout.

SUMMARY OF THE INVENTION

A high solids coating composition which contains about 40–80% by weight of a binder and correspondingly about 20–60% by of a liquid organic carrier; wherein the binder contains about:

a. 15–70% by weight, based on the weight of the binder, of an acrylic solution polymer of polymerized monomers of ethylenically unsaturated esters of acrylic acid or methacrylic acid and a hydroxy alkyl acrylate or methacrylate and the polymer has a hydroxyl no. of about 50–200 and a weight average molecular weight of about 4,000–20,000;

b. 5–25% by weight, based on the weight of the polymer, of a dispersed polymer of polymerized monomers comprising stabilizer resin segment that is soluble in the organic carrier and a dispersed resin segment that is relatively insoluble in the organic carrier;

c. 10–40% by weight, based on the weight of the binder, of a siloxane oligomer having —OH and —OR groups attached to the silane atoms of the oligomer where R is an alkyl group having 1–6 carbon atoms in the alkyl group or an aryl group and the oligomer has a weight average molecular weight of about 500–5,000; and d. 15–40% by weight, based on the weight of the binder of an alkylated melamine formaldehyde resin.

DETAILED DESCRIPTION OF THE INVENTION

The coating composition of this invention is used primarily as a clear coating over conventional pigmented finishes to form a clear coat/color coat finish or the composition can be pigmented and used as a monofinish or as the color coat for a clear coat/color coat finish where the clear coat is the composition of this invention or another clear coat. Finishes formed from the coating composition of this invention have an excellent appearance, are glossy, durable and weatherable and have excellent adhesion to a variety of substrates such as previously painted substrates wherein the paint is cured, dried or still wet, treated and untreated steel, steel primed with conventional and electrodeposition primers, plastic substrates and plastic fiber glass reinforced substrates.

In particular, when the coating composition of this invention is used a clear coat, it forms a clear glossy finish that has excellent weatherability and durability and is resistant to etching by acidic fallout such as acid rain. Its spray application properties are excellent and its adhesion to all types of color coats such as water based, solvent based or powder is excellent.

The coating composition has a film forming binder content of about 40–80% by weight and correspondingly about 20–60% by weight of a liquid organic carrier for the binder. When used as a clear coating composition, the composition may contain very small amount of pigments to eliminate color such as yellowing. When used as pigmented composition, pigments are used in pigment to binder weight ratio of about 1:100–200:100.

The film forming binder of the composition contains about 15–70% by weight of an acrylic polymer of polymerized monomers of ethylenically unsaturated esters of acrylic acid or methacrylic acid and hydroxy alkyl acrylates or methacrylates to form a polymer having a hydroxyl no. of about 50–200 and a weight average molecular weight of about 4,000–20,000.

All molecular weights herein are determined by gel permeation chromatography generally using polystyrene as the standard.

The acrylic polymer is prepared by conventional solution polymerization methods in which polymers in a solvent with a polymerization catalyst are reacted for about 2–6 hours at 100°–170° C. to form a polymer solution.

Typically useful ethylenically unsaturated ester of acrylic and methacrylic acid are methyl methacrylate, ethyl methacrylate, propyl methacrylate, butyl methacrylate, pentyl methacrylate, hexyl methacrylate, ethyl hexyl methacrylate, nonyl methacrylate, lauryl methacrylate, methyl acrylate, ethyl acrylate, propyl acrylate, butyl acrylate, pentyl acrylate, hexyl acrylate, ethyl hexyl acrylate, nonyl acrylate, lauryl acrylate and the like.

Up to about 25% by weight of other polymerizable monomers can be used in the acrylic polymer such as styrene, methyl styrene, acrylamide, acrylonitrile, methacrylonitrile, methacrylamide, methylol methacrylamide and methylol acrylamide and the like.

One preferred acrylic polymer contains about 10–20% by weight of styrene, 40–60% by weight of alkyl methacrylate or acrylate having 1–6 carbon atoms in the alkyl group, and 30–45% by weight of hydroxy alkyl acrylate or methacrylate having 1–4 carbon atoms in the alkyl group. One such polymer contains 15% by weight styrene, 30% by weight butyl methacrylate, 17% butyl acrylate and 38% by weight hydroxy propyl acrylate.

The dispersed polymer is a typical polymer of polymerized monomers having stabilizer resin segments that are soluble in the liquid organic carrier of the coating composition and dispersed resin segment or segments that are relatively insoluble in the organic carrier. The dispersed polymer is prepared by forming the dispersed resin by polymerizing monomers such as ethylenically unsaturated esters of acrylic or methacrylic acid, as disclosed above and the other polymerizable monomers disclosed above, in an organic liquid in which the resulting polymer is insoluble. The polymerization takes place in the presence of a stabilizer resin which is soluble in the organic liquid such as poly-12-hydroxy stearic acid, a soluble acrylic resin or a soluble melamine resin. The resulting dispersed polymer typically has a particle size of about 0.1-4.0 microns and a weight average molecular weight of about 50,000-100,000. The stabilizer resin of the polymer typically has a weight average molecular weight of about 500-10,000. Generally, azo and peroxy polymerization initiators that are well known in the art are used to form the dispersed polymer.

Generally, the dispersed polymer contains about 25-50% by weight of the stabilizer resin and about 50-75% by weight of the dispersed resin. One useful composition contains dispersed resin which is relatively insoluble in the organic liquid carrier and contains about 10-20% by weight styrene, 40-60% by weight of an alkyl methacrylate or acrylate having 1-3 carbon atoms in the alkyl group, 20-30% by weight of a hydroxy alkyl methacrylate or acrylate having 1-4 carbon atoms in the alkyl group, 2-6% by weight of methacrylic acid or acrylic acid and 1-2% by weight of glycidyl acrylate or methacrylate. The stabilizer resin which is soluble in the organic liquid carrier contains about 10-20% by weight styrene, 65-78% by weight of an alkyl acrylate or methacrylate having 4-8 carbon atoms in the alkyl group, 5-10% by weight of a hydroxy alkyl acrylate or methacrylate having 1-4 carbon atoms in the alkyl group and 1-4% by weight of methacrylic acid or acrylic acid reacted with about 1-2% by weight of glycidyl methacrylate.

One preferred dispersed polymer contains a dispersed resin of about 10-20% by weight styrene, 10-20% by weight methyl acrylate, 30-40% by weight methyl methacrylate, 20-30% by weight hydroxyethyl acrylate, 2-6% by weight methacrylic acid reacted with 1-2% by weight glycidyl methacrylate and stabilizer resin of about 10-20% by weight styrene, 25-30% by weight butyl methacrylate, 40-48% by weight butyl acrylate, 5-10% by weight hydroxy ethyl acrylate, 1-4% by weight methacrylic acid reacted with about 1-2% by weight glycidyl methacrylate.

It may be necessary to add about 0.5-5% by weight, based on the weight of the binder, of a microgel to the coating composition to improve spray application properties such as the elimination of sagging of the composition on application or the improvement of physical properties of the cured finish such as hardness and durability. These microgels are crosslinked polymeric dispersions prepared by polymerizing monomers such as ethylenically unsaturated esters of acrylic or methacrylic acid, as disclosed above and the other polymerizable monomers disclosed above. The polymerization takes place in the presence of a polymeric stabilizer copolymer of poly-12-hydroxy stearic acid and other polymerized monomers of methacrylate or acrylate esters. The copolymer is soluble in the organic liquid used in the coating composition. Typically, these microgels contain about 90-98% by weight of the polymerized monomers and 2-10% by weight of polymeric stabilizer copolymer.

A useful microgel is the copolymerization product of 60-70% by weight of an alkyl methacrylate or acrylate having 1-4 carbon atoms in the alkyl group, 20-30% by weight of styrene, 5-10% by weight of a hydroxy alkyl methacrylate or acrylate, 0.5-2.0% by weight of glycidyl methacrylate or acrylate in the presence of a polymeric stabilizer of poly-12-hydroxystearic acid, an alkyl methacrylate or acrylate having 1-4 carbon atoms in the alkyl group and glycidyl methacrylate or acrylate. One preferred microgel is the polymerization product of methyl methacrylate, styrene, hydroxy ethyl acrylate, methacrylic acid in the presence of a polymeric stabilizer of poly-12-hydroxy stearic acid, methyl methacrylate and glycidyl methacrylate.

The siloxane oligomer used in the coating composition has —OH and —OR groups attached to the Si atoms of the oligomer. R is an alkyl group having 1-6 carbon atoms or an aryl group. One preferred oligomer only has —OH groups. The oligomer has a weight average molecular weight of about 500-5,000.

One useful oligomer is a ladder structure polymer prepared by hydrolysis and condensation of mono and dialkyl or diaryl chlorosilanes such as methyl chlorosilane, propyl chlorosilane, hexyl chloropropyl silane and the like, diphenyl dichlorosilane, phenyl trichlorosilane, methyltrichlorosilane, propyltrichlorosilane, dimethyldichlorosilane and the like.

The following is typical structure of such an oligomer:

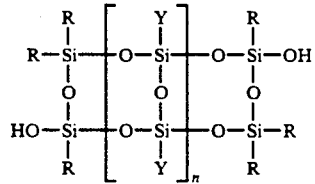

where n is 0-10, R is an alkyl group having 1-6 carbon atoms or an aryl group and Y is either R or OH. These siloxane oligomers have hydroxyl content of about 3-10% by weight and a weight average molecular weight of about 500-3,000.

Other siloxane oligomers can be used and are prepared by the controlled hydrolysis of of $R_m$—Si—$(X)_{4-m}$; where m is 1-3. R is as defined above and X is a hydrolyzable group such as a halogen for example chloride,

OCR and the like, where R is defined above. These oligomers have a weight average molecular weight of about 500-2,000 and have a residual reactive functionality (X or OH) of about 3-20% by weight.

Preferably, about 10-40% by weight, based on the weight of the binder of the composition, of the siloxane oligomer is used.

Melamine based crosslinking agents are used in the composition to crosslink the above components. Typically, these crosslinking agent are the reaction products of melamine with formaldehyde and various alcohols of 1-4 carbon atoms. Preferred are hexamethoxymethyl melamine and the mixed methylated and butylated melamine formaldehyde. In particular, the following are preferred: "Cymel" 1168, 1161, 1130 and "Resimine" 755.

Preferably, about 15-40 % by weight, based on the weight of the binder of the composition, of the melamine crosslinking agent is used.

Generally, about 0.2-2.0% by weight of a catalyst is used to accelerate the cure of the composition. Typically useful catalysts are sulfonic acid catalysts such as para toluene sulfonic acid, dodecyl benzene sulfonic acid and the like, alkyl metal esters such dibutyl tin dilaurate, aluminum acetyl acetonate, tetraisopropyl titanate, mono and dibutyl ester of phosphoric acid.

The coating composition can contain about 0.01-4.00% by weight, based on the weight of the binder, of ultraviolet light stabilizers particularly when the composition is used as a clear coat over a base coat as an automotive or truck exterior finish. These ultraviolet light stabilizers include ultraviolet light absorbers, screeners and quenchers. Typical ultraviolet light stabilizers include benzophenones, triazines, triazols, benzoates, hindered amines and blends and mixtures thereof.

The composition can be used as a monocoat or as a color coat of a clear coat/color coat finish. The composition then contains pigments. Typical pigments that can be used are metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatible polymer or dispersant by conventional techniques such as high speed mixing, sand grinding, ball milling, attritor grinding or two roll milling. The mill base is then blended with the other constituents used in the composition.

The coating composition can be applied to plastic or metal substrates by conventional techniques such as spraying, electrostatic spraying, dipping brushing, flowcoating and the like. The preferred methods are spraying and electrostatic spraying. After application, the composition is baked at 100°-150° C. for about 15-30 minutes to form a coating about 0.1-3.0 mils thick. When the composition is used as a clear coat, it is applied over the color coat which may be completely dried and cured or preferably is flash dried for a short period before the clear coat is applied. The clear coat/color coat finish is baked as above to provide a dried and cured clear finish about 1.5-2.5 mils thick.

The following examples illustrate the invention. All parts and percentages are on a weight basis unless otherwise indicated.

EXAMPLE 1

A clearcoat composition was prepared by mixing together the following components:

|  | Parts by Weight |
|---|---|
| Microgel Resin A solution (prepared below) | 42.0 |
| "Cymel" 1168 (methylated and isobutylated melamine formaldehyde resin having a degree of polymerization of about 1.75) | 122.0 |
| "Tinuvin" 900 Solution (30% of a benzotriazole UV light stabilizer in xylene) | 37.0 |
| "Tinuvin" 079 solution (a 40% solids hindered amine light stabilizer in xylene) | 13.8 |
| Siloxane solution (70% Dow Corning 62230 having the structural formula set forth above where R is methyl and phenyl in Solvesso 100 aromatic solvent) | 236.0 |
| Acrylic Resin B (prepared below) | 162.0 |
| NAD Resin C (prepared below) | 175.0 |
| Dodecylbenzene sulfonic acid (70% in isopropanol) | 9.8 |
| Xylene | 45.0 |
| Butanol | 35.0 |
| Methanol | 13.0 |
| Total | 890.6 |

The resulting clearcoat composition contained 25% acrylic resin B, 30% siloxane oligomer, 20% NAD resin, 22% alkylated melamine formaldehye crosslinking resin and 3% microgel resin A.

The clearcoat composition was adjusted with xylene to a 28 second viscosity determined with a #4 Ford Cup. The weight solids at this viscosity is 58% (60 min. at 110° C.). A dark blue metallic polyester modified acrylic melamine basecoat was sprayed over an electrodeposited primed steel panel. After a 5 minute wait the above clearcoat composition was sprayed over the basecoat. Two coats were applied to provide a 2 mil clear coat film thickness. The wet basecoat/clearcoat composition was baked for 20 minutes at 130° C.

The resultant coating had a high gloss (93° on a 20° gloss meter). The hardness was 8 knoop units as measured with a Tukon Hardness Machine. The coating was resistant to solvents as shown by the following tests: 100 double rubs with xylene or methylethyl ketone had no effect; immersion in gasoline for 20 cycles of 5 minutes each and showed no degradation.

The coating had excellent resistance to etching as shown by the following test: the coated panel was exposed to 10% sulfuric acid for 15 minutes on a thermal gradient bar, there was no etching of the surface below 55° C.; etching increased with intensity as the temperature on the gradient bar increased over the above temperature.

Microgel Resin A

A crosslinked acrylic dispersion was prepared by copolymerizing 175 parts by weight methyl methacrylate, 68 parts by weight styrene, 21 parts by weight hydroxyethyl acrylate, 2.5 parts by weight methacrylic acid and 2.5 parts by weight of glycidyl methacrylate in the presence of 56.8 parts by weight polymeric stabilizer which is a copolymer of poly-12-hydroxy stearic acid, methyl methacrylate, glycidyl methacrylate and methacrylic acid. The polymeric stabilizer is 40% solids in 2/1 butyl acetate/VMP Naptha. The dispersion when made had 40% nonvolatile solids in 2.4/1 heptane/mineral spirits mixture. It was then stripped to 57% nonvolatile solids by reflux distillation and mixed with "Resimene" 755, a mixed methylated and butylated melamine resin, so that the ratio of dispersed resin solids to melamine resin solids was 57/43. The dispersed particle size is approximately 0.3 micron. The solids content of the dispersion was 70%.

Acrylic Resin B

A polymer of 15% sytrene, 30% butyl methacrylate, 17% butyl acrylate, 38% hydroxypropyl acrylate at 70% solids in 3/1 Solvesso 100/Xylene. The viscosity of the resin is Y-Z1 on the Gardner-Holdt scale measured at 25° C. The weight average molecular weight is 9800.

NAD Resin C

A dispersion of an acrylic resin stabilized by an acrylic polymer. On a solids basis, the stabilizer resin is 36%, the dispersed resin is 64%. The stabilizer resin is a polymer of 15% styrene, 28% butyl methacrylate, 43% butyl acrylate, 10% hydroxyethyl acrylate and 2.3% methacrylic acid reacted with 1.7% glycidyl methacrylate. The stabilizer acrylic resin has an I-M Gardner-Holdt viscosity at 63% nonvolatile solids in 85/15 xylene/butanol solvent blend.

The dispersed polymer is prepared by copolymerizing 15% styrene, 18% methyl acrylate, 36.5% methyl methacrylate, 25% hydroxyethyl acrylate, 4% methacrylic acid and 1.5% glycidyl methacrylate in the presence of the stabilizer acrylic resin. The resin is prepared at reflux in 5% isopropanol, 55% VMP Naphtha, 30% heptane and 10% butanol in the presence of 2% butyl peroctoate based on monomer.

EXAMPLE 2

A clearcoat composition was prepared by blending together the following constituents:

| | Parts by Weight |
|---|---|
| "Resimene" 755 (mixed methylated and butylated melamine resin) | 141.0 |
| "Tinuvin" 1130 (benzotriazole UV light stabilizer) | 11.0 |
| "Tinuvin" 440 (hindered amine light stabilizer) | 5.5 |
| Dow Corning Z-6018 (70% in Solvesso 100 hydroxy functional siloxane oligomer having the structure described above where R is propyl and phenyl and having 6.4% hydroxyl content) | 161.0 |
| Acrylic Resin B (described in Example 1) | 301.0 |
| NAD Resin C (described in Example 1) | 121.0 |
| Dodecylbenzene Sulfonic Acid | 6.5 |
| Dibutyltin dilaurate | 5.6 |
| Total | 752.6 |

The resulting clearcoat composition contained 38% acrylic resin B, 22% siloxane oligomer, 14% NAD resin and 26% alkylated melamine formaldehyde crosslinking resin.

The clearcoat composition was applied in the same manner to the same basecoated substrate as in Example 1 and cured as in Example 1. The hardness and gloss were measured as in Example 1. The hardness was 5.8 knoop, the gloss was 93, there was no marring by rubbing the coating with a cloth soaked in xylene 100 times. When exposed to 10% sulfuric acid, as described in Example 1, there was no etching below 49° C. on the thermal qradient bar.

EXAMPLE 3

A clearcoat composition was prepared that contained a hydroxy functional polyester resin to provide improved flexibility to the clearcoat. The following constituents were blended together:

| | Parts by Weight |
|---|---|
| Microgel Resin A (prepared in Example 1) | 381 |
| "Cymel" 1168 (described in Example 1) | 1240 |
| "Tinuvin" 900 Solution (30% in Xylene described in Example 1) | 327 |
| "Tinuvin" 440 Solution (30% in Xylene described in Example 2) | 169 |
| Dow Corning 62230 solution (70% in Solvesso 100 described in Example 1) | 2177 |
| Acrylic Resin B (prepared in Example 1) | 1083 |
| Polyester Resin D (prepared below) | 550 |
| NAD Resin C (described in Example 1) | 1185 |
| Methanol | 123 |
| Dodecylbenzene sulfonic acid (70% in isopropanol) | 60 |
| Total | 7295 |

The resulting clearcoat composition contained 25% acrylic resin B, 30% siloxane oligomer, 15% NAD resin, 27% alkylated melamine formaldehyde crosslinking resin and 3% microgel resin A.

This clearcoat composition was reduced with Solvesso 100 solvent to a viscosity of 23 sec. measured with a #4 Ford Cup. The solids at spray viscosity are 55.9%. The clearcoat was applied to the same substrate as in Example 1 and cured in the same manner as Example 1.

The resulting coating had a 20° gloss of 87 and a Tukon Hardness of 9.6 and the minimum temperature that no spot was produced by 1? % sulfuric acid after 15 minutes was 49° C.

Polyester Resin D

A reaction product of 1.5 moles of 1,4-cyclohexyl dimethanol, 0.8 moles of 1,3 cyclohexyldicarboxylic acid and 0.2 moles adipic acid was reacted until an acid number of 8 was reached. When reduced with 90/10 propylene glycol monomethylether acetate/xylene, the viscosity was 2 (Gardner Holdt) at 75% nonvolatile solids.

This following illustrates a clearcoat composition which does not contain siloxane oligomer. The following constituents were blended together:

| | Parts by Weight |
|---|---|
| Microgel Resin A (prepared in Example 1) | 57.0 |
| "Cymel" 1168 (described in Example 1) | 203.0 |
| Acrylic Resin B (prepared in Example 1) | 272.0 |
| NAD Resin C (described in Example 1) | 190.0 |
| Methanol | 11.0 |
| Dodecylbenzene sulfonic acid (70% in isopropanol) | 9.8 |
| "Tinuvin" 900 Solution (30% in Xylene described in Example 1) | 34.2 |
| "Tinuvin" 440 (described in Example 2) | 5.7 |
| 2-Amino-2 methyl propanol | 1.3 |
| Total | 784.0 |

The clearcoat composition was reduced to a 28 second viscosity (#4 Ford Cup) with xylene. The weight solids at this viscosity (60 min at 110° C.) was 57%. The clear coat was sprayed onto the same substrate as in Example 1 and cured as in Example 1. The resulting coating had a 20° gloss of 91, the Knoop hardness was 5.1, there was no marring by 100 rubs with a xylene soaked cloth.

The temperature at which no etching occurred when exposed to 10% sulfuric acid on the thermal gradient bar for 15 minutes, was below 45° C., the lowest temperature on the gradient bar which is not the level of etching required for an improved automotive finish.

EXAMPLE 4

The following pigmented coating composition was prepared by blending together the following constituents:

|  | Parts by Weight |
|---|---|
| Microgel Resin A (prepared in Example 1) | 19.0 |
| "Cymel" 1168 (described in Example 1) | 110.0 |
| Dow Corning 62230 (70% in aromatic solvent described in Example 1) | 210.0 |
| Acrylic Resin E (prepared below) | 145.0 |
| NAD Resin C (prepared in Example 1) | 156.0 |
| "Tinuvin" 900 Solution (30% in Xylene described in Example 1) | 28.3 |
| Black dispersion (prepared below) | 76.0 |
| Dodecylbenzene sulfonic acid (70% in isopropanol) | 32.0 |
| Total | 776.3 |

The composition was adjusted to 28 seconds (#4 Ford Cup), sprayed onto primed steel panels at 2.0 mil film thickness and baked 20 minutes at 285° F. At 28 seconds viscosity, the weight percent solids was 56%. The cured composition had a 20° gloss of 90, a Tukon hardness reading of 9 and excellent gasoline resistance. When exposed to 10% sulfuric acid for 15 minutes on a gradient bar, there was no etching of the surface below 55° C.

A pigmented black enamel without the siloxane oligomer gave similar performance properties, but the minimum temperature at which etching occurred was 50° C.

BLACK DISPERSION

A carbon black pigment (Degussa FW 200) was dispersed in a ball mill with a copolymer of methyl methacrylate, butyl methacrylate and glycidyl methacrylate at 40% solids (1/1 pigment to resin) and then reduced to 30% solids.

ACRYLIC RESIN E

A copolymer of 25% styrene, 44% isobutyl methacrylate, 30% hydroxyethyl acrylate and 1% acrylic acid at 70% solids in 2/1 xylene/butyl acetate. The viscosity is Z2 (Gardner Holdt). The weight average molecular weight is 8500.

We claim:

1. A high solids coating composition comprising about 40-80% by weight of a binder and correspondingly about 20-60% by of a liquid organic carrier; wherein the binder consist essentially of about:
   a. 15-70% by weight, based on the weight of the binder, of an acrylic polymer being in solution consisting essentially of polymerized monomers of ethylenically unsaturated esters of acrylic acid or methacrylic acid and a hydroxy alkyl acrylate or methacrylic and the polymer has a hydroxyl no. of about 50-200 and a weight average molecular weight of about 4,000-20,000;
   b. 5-25% by weight, based on the weight of the polymer, of a dispersed polymer of polymerized monomers comprising stabilizer resin segment that is soluble in the organic carrier and dispersed resin segment that is relatively insoluble in the organic carrier;
   c. 10-40% by weight, based on the weight of the binder, of a siloxane oligomer having the following structural formula:

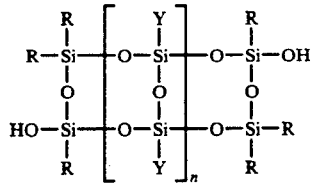

where n is 0-10, R is an alkyl group having 1-6 carbon atoms or an aryl group and Y is either R or —OH and the oligomer has a hydroxyl content of about 3-10% by weight and a weight average molecular weight of about 500-5000; and
   d. 15-40% by weight, based on the weight of the binder, of an alkylated melamine formaldehyde resin.

2. The coating composition of claim 1 in which the acrylic polymer contains up to 25% by weight of polymerized monomers of styrene, methyl styrene, acrylamide, methacrylamide, methacrylamide, methylol methacrylamide and methylol acrylamide.

3. The coating composition of claim 2 in which the acrylic polymer consists essentially of polymerized monomers of about 10-20% by weight styrene, 40-60% by weight of an alkyl acrylate or methacrylate having 1-6 carbon atoms in the alkyl group and 30-40% by weight of a hydroxy alkyl methacrylate or acrylate having 1-4 carbon atoms in the alkyl group.

4. The coating composition of claim 3 in which the acrylic polymer consists essentially of polymerized monomers of styrene, butyl methacrylate, butyl acrylate and hydroxy propyl acrylate.

5. The coating composition of claim 1 in which the dispersed polymer consists essentially of dispersed resin segment of polymerized monomer of ethylenically unsaturated ester of acrylic or methacrylic acid in the presence of a stabilizer resin segment soluble in the liquid organic carrier selected from the group of poly-12-hydroxy stearic acid, soluble acrylic resin or a soluble melamine resin; wherein the resulting polymer has a particle size of about 0.1-4.0 microns and a weight average molecular weight of about 50,000-100,000.

6. The coating composition of claim 5 in which the dispersed polymer consists essentially of about 50-75% by weight of dispersed resin segment and 25-50% by weight of stabilizer resin segment; wherein the dispersed resin segment consists essentially of about 10-20% by weight styrene, 40-60% by weight alkyl methacrylate or alkyl acrylate having 1-3 carbon atoms in the alkyl group, 20-30% by weight of hydroxy alkyl acrylate or hydroxy alkyl methacrylate having 1-4 carbon atoms in the alkyl group, 2-6% by weight of methacrylic acid or acrylic acid and 1-2% by weight of glycidyl methacrylate or glycidyl acrylate and the stabilizer resin segment consists essentially of about 10-20% by weight styrene, 65-78% by weight alkyl acrylate or alkyl methacrylate having 4-8 carbon atoms in the alkyl group, 5-10% by weight of hydroxy alkyl acrylate or hydroxy alkyl methacrylate having 1-4 carbon atoms in the alkyl group and 1-4% by weight of methacrylic acid or acrylic acid reacted with glycidyl methacrylate or glycidyl acrylate.

7. The coating composition of claim 1 containing about 0.5-5% by weight, based on the weight of the binder, of microgel in which the microgel consists essentially of a crosslinked polymeric dispersion of polymerized monomers of ethylenically unsaturated esters of acrylic or methacrylic acid polymerized in the presence of a polymeric stabilizer polymer.

8. The coating composition of claim 7 in which the microgel consists essentially of about 90-98% by weight of polymerized monomers and 2-10% by weight of polymeric stabilizer polymer.

9. The coating composition of claim 8 in which the microgel consists essentially of about 60-70% by weight of an alkyl methacrylate or an alkyl acrylate having 1-4 carbon atoms in the alkyl group, 20-30% by weight of styrene, 5-10% by weight of hydroxy alkyl acrylate or hydroxy alkyl methacrylate having 1-4 carbon atoms in the alkyl group and 0.5-2% by weight of glycidyl methacrylate or glycidyl acrylate polymerized in the presence of poly-12-hydroxy stearic acid.

10. The coating composition of claim 1 in which the alkylated melamine formaldehyde resin is a mixed methylated and butylated melamine formaldehyde.

11. The coating composition of claim 1 containing about 0.01-4% by weight, based on the weight of the binder, of ultraviolet light stabilizers.

12. The coating composition of claim 1 containing pigment in a pigment to binder weight ratio of about 1/100-200/100.

* * * * *